(12) United States Patent
Fink

(10) Patent No.: US 7,816,635 B2
(45) Date of Patent: Oct. 19, 2010

(54) AIR VEHICLE WING PIVOT

(75) Inventor: Lawrence E. Fink, Renton, WA (US)

(73) Assignee: The Boeing Company, Chicago, IL (US)

( * ) Notice: Subject to any disclaimer, the term of this patent is extended or adjusted under 35 U.S.C. 154(b) by 529 days.

(21) Appl. No.: 11/934,083

(22) Filed: Nov. 2, 2007

(65) Prior Publication Data

US 2010/0038470 A1 Feb. 18, 2010

(51) Int. Cl.
*F42B 10/14* (2006.01)
(52) U.S. Cl. .................... 244/3.28; 244/46; 244/49; 102/490
(58) Field of Classification Search ............... 244/7 A, 244/3.24, 3.27, 3.28, 49, 46; 102/374, 490
See application file for complete search history.

(56) References Cited

U.S. PATENT DOCUMENTS

| 4,132,374 A | 1/1979 | Abell |
| 6,745,979 B1 * | 6/2004 | Chen ........................... 244/46 |
| 2005/0211827 A1 * | 9/2005 | Barocela ....................... 244/46 |

\* cited by examiner

*Primary Examiner*—Timothy D Collins
(74) *Attorney, Agent, or Firm*—Felix L. Fischer

(57) ABSTRACT

A stowable wing structure incorporates a wing having a span equal to a fuselage length and movable from a stowed position longitudinally aligned with the fuselage to a deployed position perpendicular to the fuselage. A pivot offset laterally from a centerline of the fuselage and aft from a symmetry point on the centerline with a corresponding offset forward toward the leading edge from a chord centerpoint on the wing allows rotation of the wing from the stowed position to the deployed position with the rotation resulting in an aft position of the chord center point relative to the fuselage symmetry point.

20 Claims, 11 Drawing Sheets

AIR VEHICLE WING PIVOT

STATEMENT REGARDING FEDERALLY SPONSORED RESEARCH OR DEVELOPMENT

This invention was developed partially with government funding pursuant to USAF contract no. F08630-03-C-0049. The United States government has certain rights in the invention disclosed herein.

BACKGROUND

1. Field

Embodiments of the disclosure relate generally to the field of compact storage of air-launched weapons systems and more particularly to a geometric location of a wing pivot for an air vehicle wing stored aligned with the vehicle fuselage and deployed to a operational position perpendicular to the fuselage with an aft shift of the aerodynamic center of the wing while remaining symmetrical in the deployed position.

2. Description of the Related Art

Cruise missiles and other air-launched or tube-launched air vehicles or reconnaissance systems must be stored in and launched from volumetrically constrained housings. A length-limited cruise missile may have a single piece wing that is stowed over or under the fuselage so that it is parallel to the missile axis. For maximum wing span with smallest volumetric size vehicle, wing 2 and fuselage 4 are of identical length and the wing is pivoted at the wing and fuselage center points 6. When deployed, the wing is perpendicular to the fuselage. However, in many cases, the optimum wing location for best aerodynamic balance and vehicle controllability is aft of the mid-point of the fuselage (shown as wing 2' centered at point 6'). Moving the wing pivot aft on the fuselage either makes the stowed wing tip 8 extend beyond the fuselage in the folded or stowed longitudinal position as shown in FIG. 1 or requires the tips to be clipped to fit. The existing solution is to move the wing pivot aft and reduce the wing span to fit within the footprint of the fuselage. Reducing the wing span reduces the aerodynamic efficiency of the wing, with impacts of decreased range and mission effectiveness. Alternatively, ballasting of the fuselage to compensate for a centered wing location can be employed but similarly impacts effective range and performance.

It is therefore desirable to provide a wing pivot which displaces the wing aft during rotation for increased aerodynamic efficiency while maintaining a wing length as long as the fuselage and symmetrical positioning of the wing in the deployed position.

It is further desirable to provide the wing pivot mechanism with minimum complexity for reduced cost and system reliability.

SUMMARY

An exemplary embodiment of a wing pivot location in a stowable wing structure is provided by a wing having a span equal to a fuselage length and movable from a first stowed position longitudinally aligned with the fuselage to a second deployed position perpendicular to the fuselage. A pivot offset laterally and aft from a symmetry point on a centerline of the fuselage and correspondingly offset laterally and forward toward the leading edge from a chord centerpoint on the wing allows rotation of the wing from the first position to the second position. The rotation results in an aft position of the chord center point relative to the fuselage symmetry point.

For design of the pivot location, a fuselage length is established and a wing span accommodated by the fuselage length with the wing in a stowed position with the wing span parallel to the fuselage is determined. A desired longitudinal displacement for wing from a symmetry point on a center line of the fuselage is determined and a pivot is laterally offset from the centerline and longitudinally offset from a symmetry point on the centerline with a corresponding offset from a centerpoint on a wing chord to induce longitudinal motion for the wing chord center with respect to the fuselage symmetry point effected by rotation from the stowed to the deployed position.

BRIEF DESCRIPTION OF THE DRAWINGS

The features and advantages of embodiments disclosed herein will be better understood by reference to the following detailed description when considered in connection with the accompanying drawings wherein.

DETAILED DESCRIPTION

Figure 1:
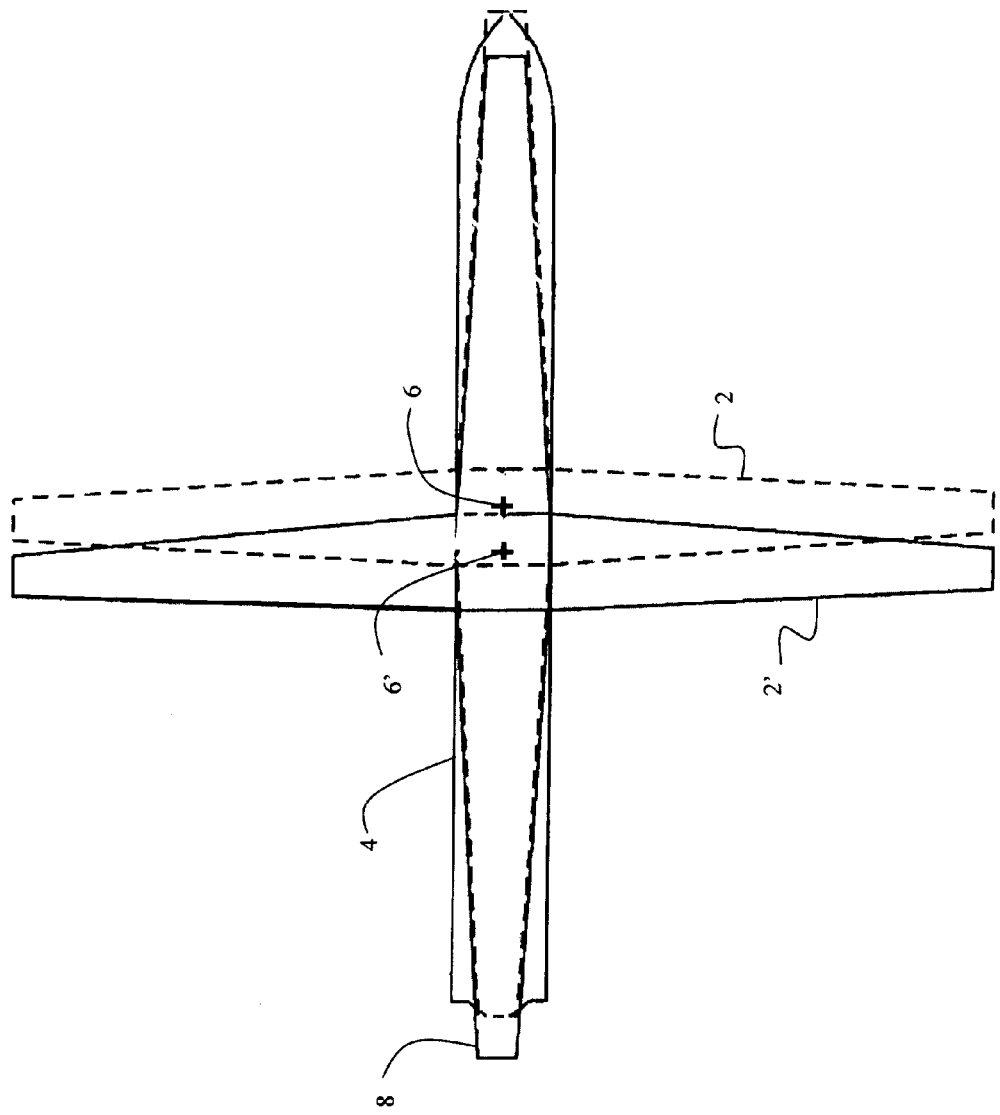
FIG. 1 is a top view of a prior art air vehicle with a pivoting wing system, showing the wing in the deployed position and in the stowed position in phantom, showing extension of the wingtip beyond the aft end of the fuselage.
Figure 2:
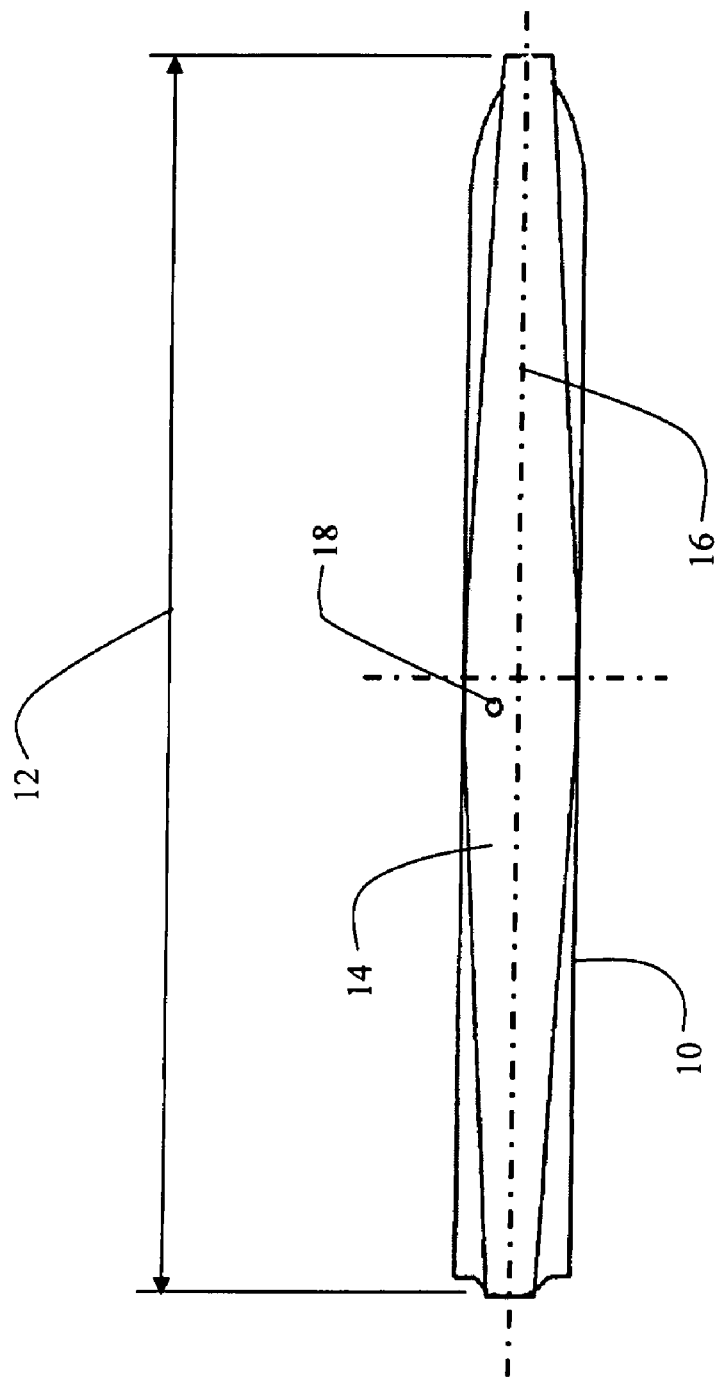
FIG. 2 is a top view a an exemplary embodiment of the present invention with the wing in the stowed position demonstrating wing span equivalent to fuselage length.
Figure 3:
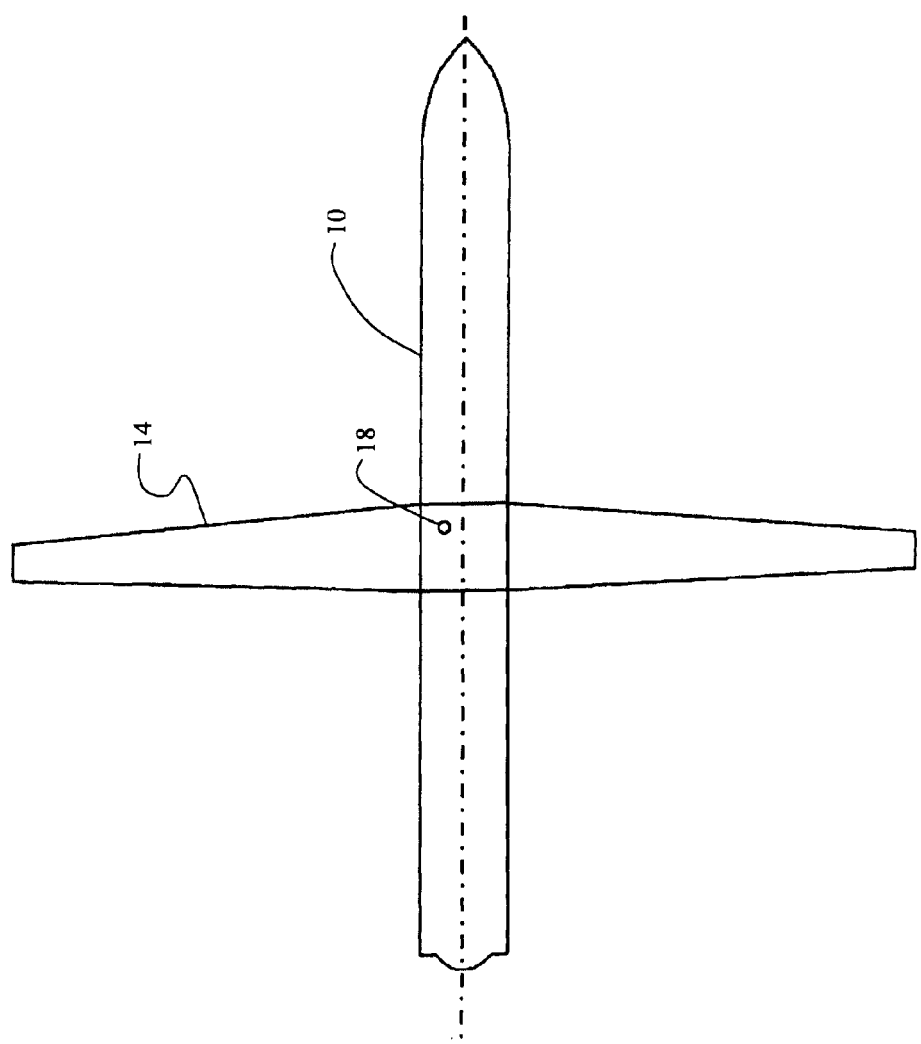
FIG. 3 is a top view of the embodiment of FIG. 2 with the wing in the deployed position showing relative position with respect to the fuselage center point and symmetrical positioning of the wing.
Figure 4:
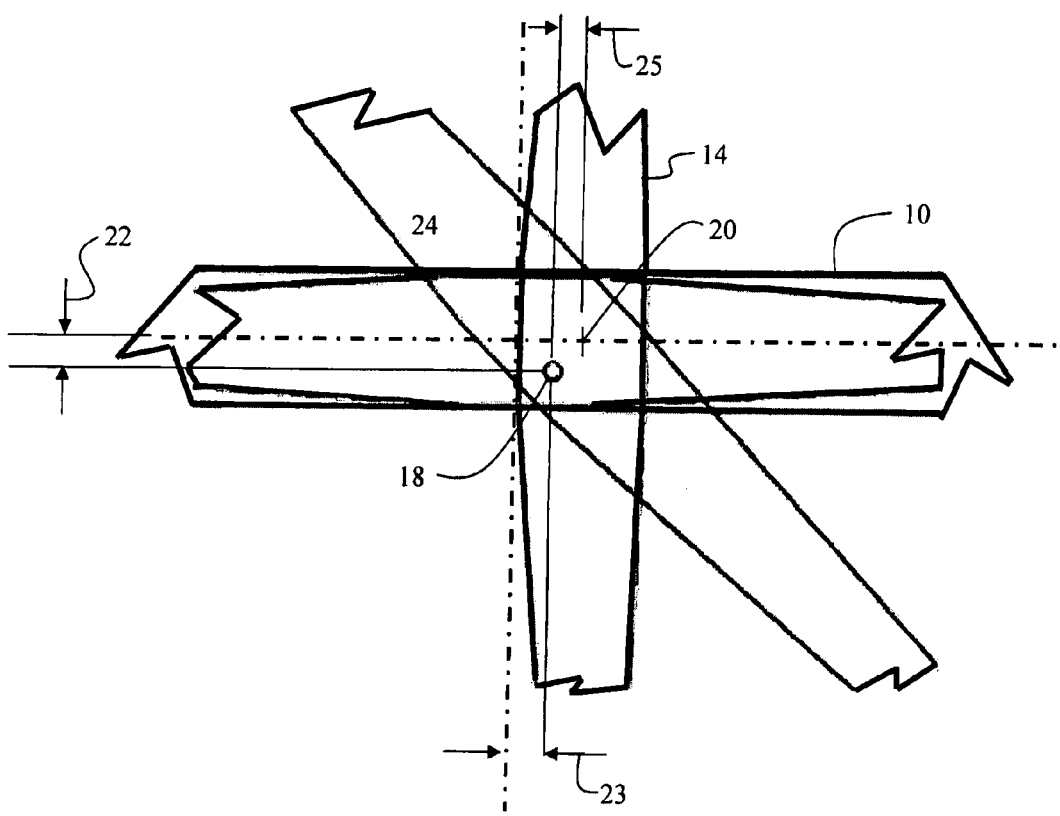
FIG. 4 is a top detailed view of the wing pivot point geometry demonstrating the off center location relative to the fuselage and wing.

An exemplary embodiment is shown in FIGS. 2, 3 and 4. The air vehicle fuselage 10 has a length 12 determined by the internal systems and propulsion requirements. This length becomes the determining dimensional benchmark for the overall system and is equal to the maximum length of a wing 14 which can be accommodated in a folded or stowed position for storage or launch from a container of minimum length.

As shown in FIG. 2, the wing in the stowed position is longitudinally aligned with the fuselage centerline 16. FIG. 3 shows the air vehicle with the wing in the deployed position substantially perpendicular to the fuselage. As shown for the embodiment in the drawings, the wing is symmetrical with respect to the fuselage thereby providing simplicity in aerodynamic control.

As shown in detail in FIG. 4, a pivot 18 for the wing is located at a point off-center from the centerline of the fuselage and forward of a chord center 20. Location of the pivot at a predetermined position laterally from the fuselage centerline and biased to the leading or trailing edge of the wing and offset from the center chord allows the wing fore or aft location relative to the fuselage center point to be determined by the rotation. For the position of the pivot shown for the exemplary embodiment in the drawings results in an aft displacement of the wing created by rotation from the stowed to deployed position. For the exemplary embodiment shown in the drawings with an air vehicle having a fuselage length of 144 inches and a center wing chord of 14 inches, the pivot is offset toward the port side of the fuselage by a lateral dimension 22 of 3.5 inches and aft by an offset 23 from the symmetry point 24 by 3.5 inches from a symmetry point on the fuselage centerline. The pivot in the wing moves toward the wing leading edge by an offset 25 of 3.5 inches from the wing chord center and to port 3.5 inches from the center chord. The port displacement is employed for clockwise rotation of the wing from the stowed to deployed position. If a counter-clockwise rotation was employed, an offset to starboard would be employed.

Figure 5:
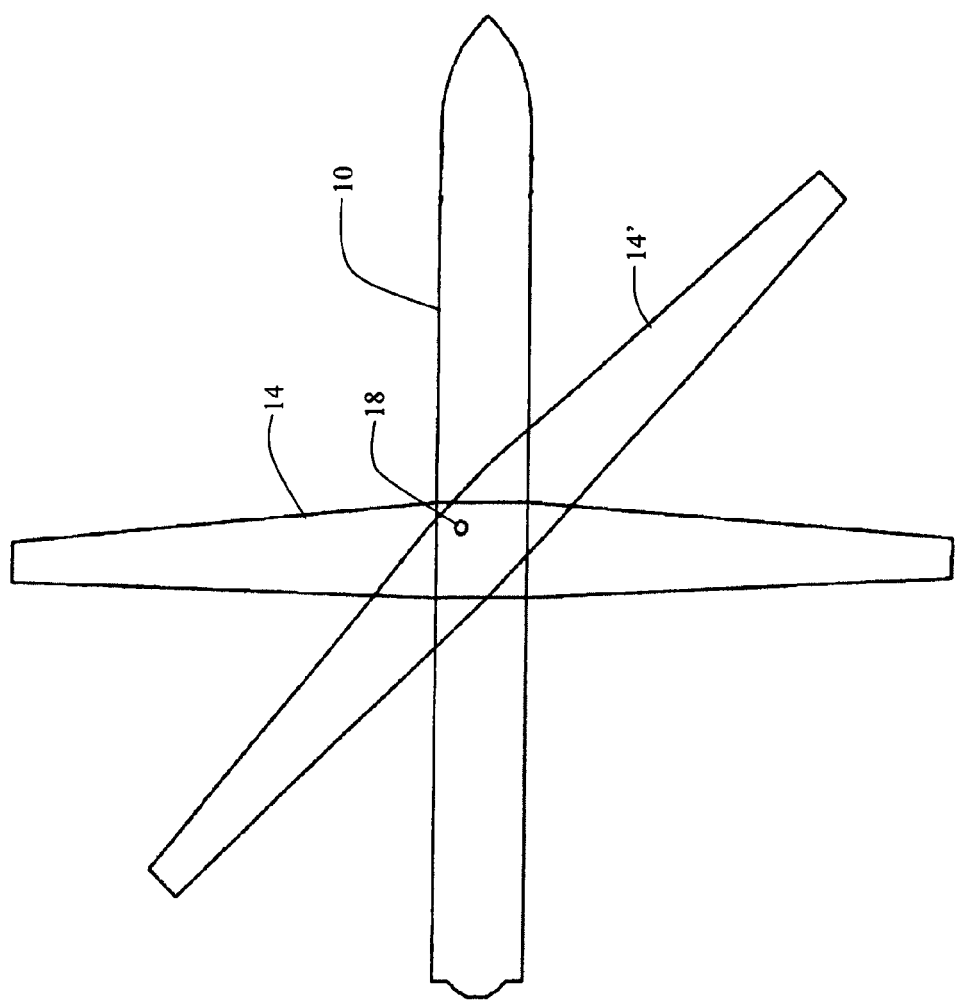
FIG. 5 is a top view of a comparative wing position for a conventional center pivot and the offset pivot point in the exemplary embodiment; and, FIG. 6A is a graph of force and moment with a symmetrical pivot point location as shown in FIG. 1.

As shown in FIG. 5 deployed wing 14 with pivot mounting 18 is 7" aft of a wing with a pivot mounting at the fuselage centerline and center of wing chord. A wing outline 14' illustrates an intermediate position between stowed and deployed for the wing of the exemplary embodiment.

The offset of the pivot point from the chord center on the wing places the pivot at approximately 25% to 30% of mean chord length for the embodiment shown. As demonstrated by the embodiment described, an engineered, precisely determined offset pivot location causes a wing whose span is equal to the fuselage length and fitting within the fuselage footprint when stowed, to have a location further aft when deployed than the usual solution of a centerline pivot location, and still retain left-right symmetry. For the application of the embodiment shown, the further aft location benefits aerodynamic balance and controllability, and the full-span wing benefits aerodynamic efficiency and hence range for the embodiment shown.

For the embodiments shown, the offset from the wing chord center and the fuselage centerline are equal to maintain symmetry of the wing with respect to the fuselage center line when deployed. In the configuration shown in the drawings where fuselage width is approximately 14 inches and wing chord is similarly approximately 14 inches a total offset within the envelope of each structure would be approximately 7 inches. In alternative embodiments wherein the wing chord is less than the fuselage width, a structural extension from the leading or tailing edge to accommodate greater longitudinal displacement created by the rotation of the wing in the deployed position may be employed.

Figure 6A:
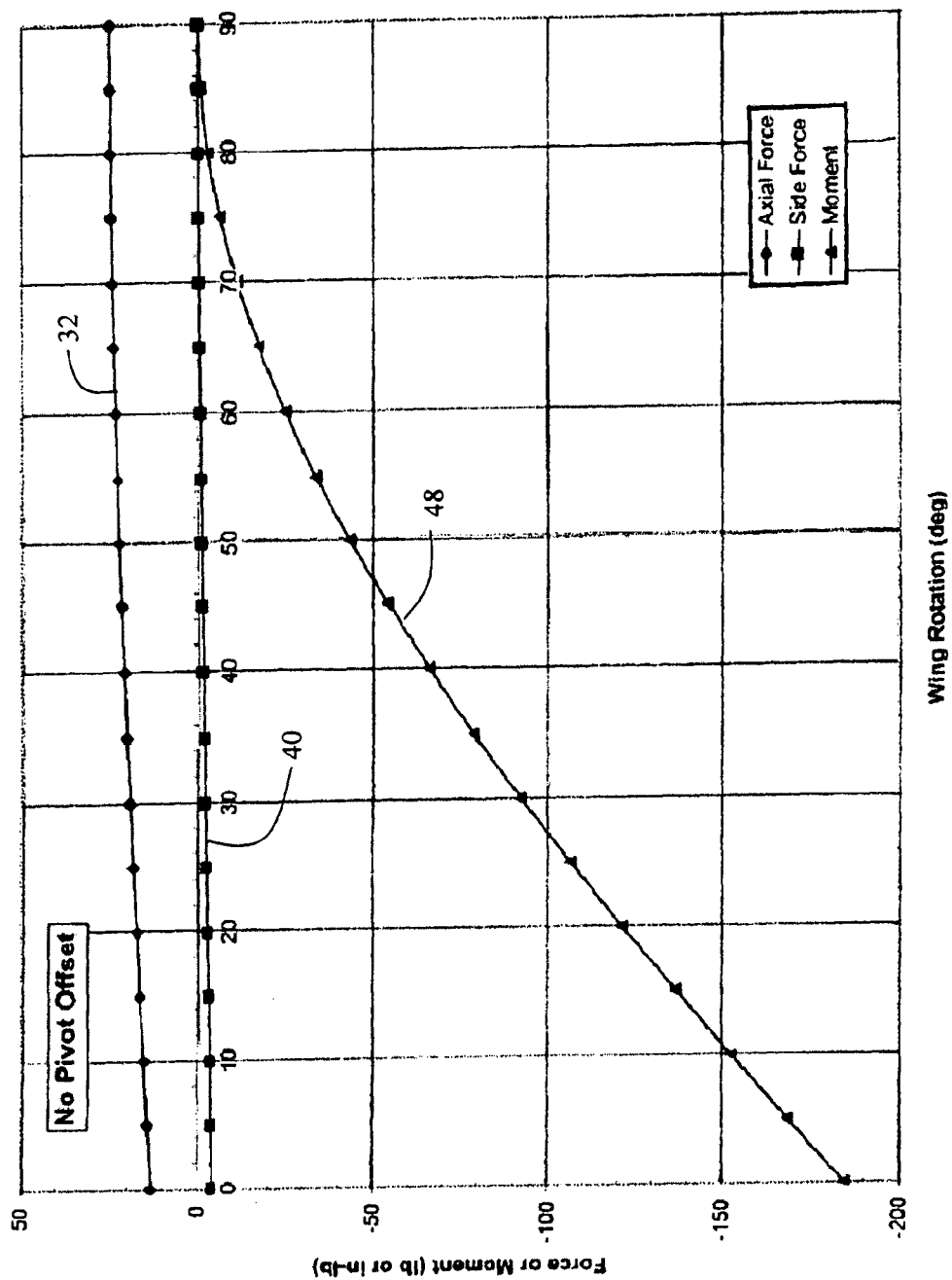
FIG. 6B is a representation of the air vehicle disclosed in FIG. 1 identifying the vector representations of the forces and wing moment in the graph of FIG. 6A.

Offset in the pivot point additionally provides mechanical advantage for pivoting of the wing. As shown in FIG. 6A for an air vehicle having a pivot point mounted on the centerline of the fuselage, the value of the axial force 32 represented by vector 34 in FIG. 6B increases slightly from an initial approximately 13 lbs in the stowed position to approximately 25 lbs in the fully deployed position. As shown in FIG. 7A for an air vehicle having an offset pivot point as disclosed for the embodiments herein, the value of the axial force 36 represented by vector 38 in FIG. 7B increases substantially identically from an initial approximately 13 lbs in the stowed position to approximately 25 lbs in the fully deployed position. No advantageous effect is present in either configuration.

Figure 6B:
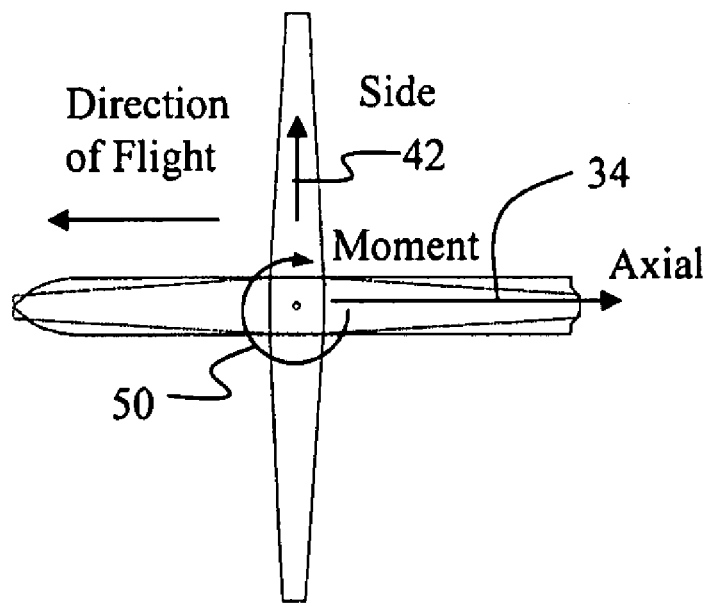
Figure 7B:
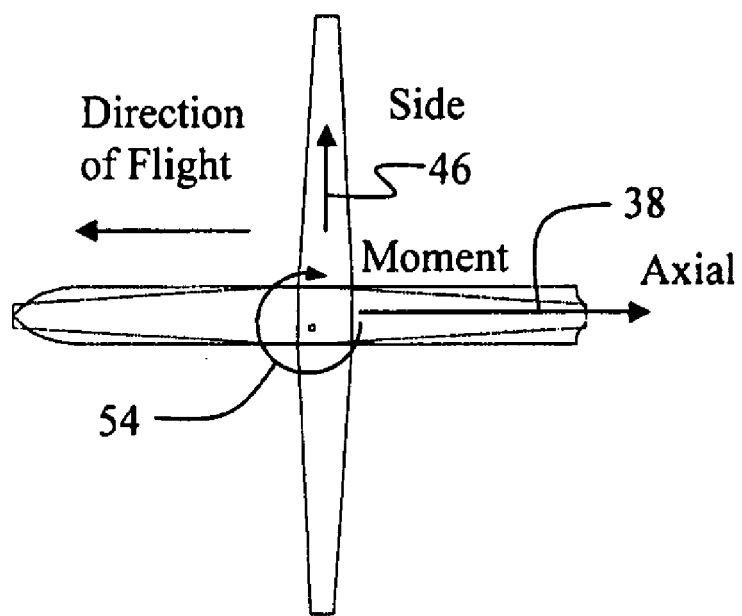
FIG. 7B is a representation of the air vehicle disclosed in the present embodiment identifying the vector representations of the forces and wing moment in the graph of FIG. 7A.
Figure 7A:
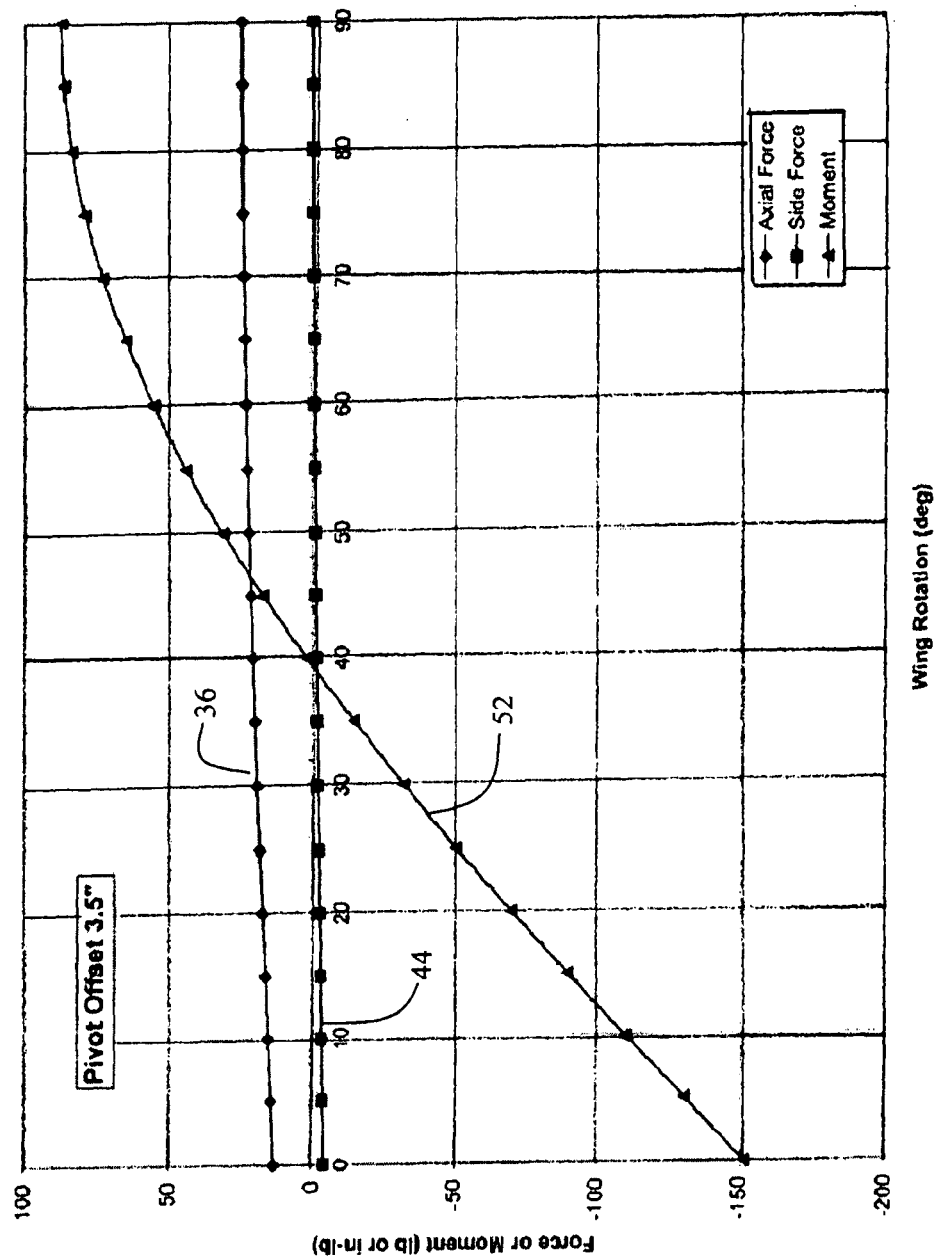
FIG. 7A is a graph of force and moment with an offset pivot point location as embodied in the air vehicle shown in FIGS. 2-4.

Similarly for the side force 40 in FIG. 6A represented by vector 42 in FIG. 6B, the force changes from approximately −4 lbs in the stowed position to 0 in the deployed position. The minor force to port in the stowed position a result of the airfoil shape of the wing presenting an unsymmetrical cross section to the stream in the stowed position. A substantially identical force change profile is shown for side force 44 in FIG. 7A represented by vector 46 in FIG. 7B. Again, no advantageous effect is present in either configuration.

Figure 8:
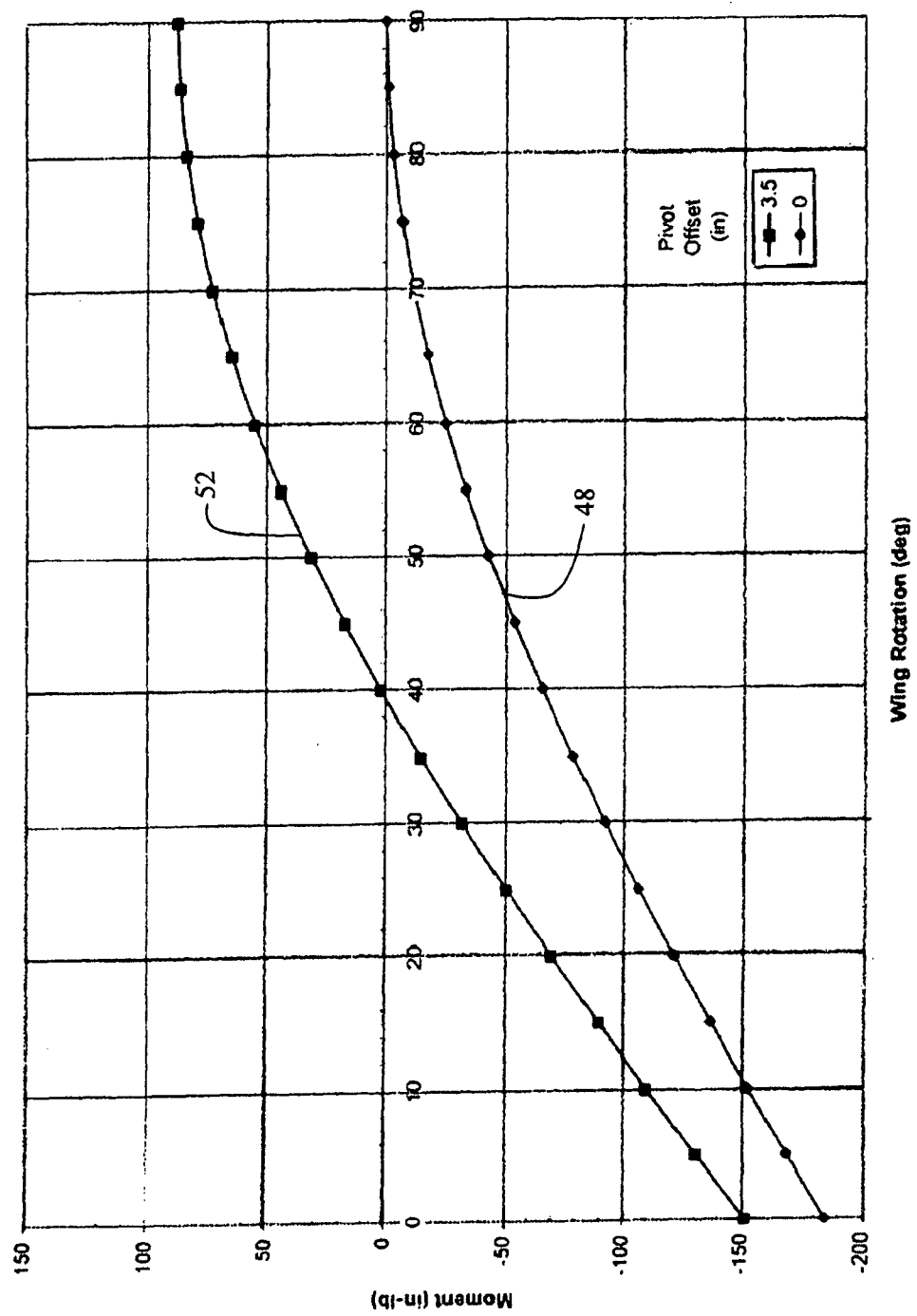
FIG. 8 is a comparative graph of the moment for the symmetrical and offset pivot points as represented in FIGS. 6A and 7A respectively.

However, the deploying moment 48 of the wing in shown in FIG. 6A and represented by vector 50 in FIG. 6B varies from about −184 in-lbs in the fully stowed position to 0 at the fully deployed position for the central pivot point configuration. During the entire deployment a rotational force urging the wing into the deployed position must be applied. The deploying moment 52 in FIG. 7A for the offset pivot point as represented by vector 54 in FIG. 7B is significantly different. The unfavorable moment for deployment in the stowed position is slightly reduced at approximately −152 in-lbs and reduces to 0 at just under 40 degrees of rotation providing a positive moment, assisting the deployment, and reaching a maximum of approximately 87 in-lbs at the fully deployed position. This positive moment further reduces the structural requirement for latching of the wing in the deployed position since a simple stop resisting the moment will provide a majority of the fixation structure required. A comparison of the two moments over the rotation from stowed to deployed is shown in FIG. 8.

Data for the embodiment of the drawings employed for the graph of FIG. 6A is shown as Table 1 with data for the graph of FIG. 7A shown as Table 2, each table providing an angle of rotation during deployment and the resulting axial force, side force and moment.

TABLE 1

| rot | no offset Axial | Side | Moment |
| --- | --- | --- | --- |
| 0 | 13.43595273 | −4.04276 | −184.468 |
| 5 | 14.44032349 | −3.69041 | −168.39 |
| 10 | 15.43705039 | −3.34074 | −152.435 |
| 15 | 16.41854772 | −2.99642 | −136.724 |
| 20 | 17.3773457 | −2.66005 | −121.376 |
| 25 | 18.30614731 | −2.33422 | −106.508 |
| 30 | 19.19788379 | −2.02138 | −92.2339 |
| 35 | 20.0457685 | −1.72393 | −78.6615 |
| 40 | 20.84334852 | −1.44412 | −65.8942 |
| 45 | 21.58455378 | −1.1841 | −54.0294 |
| 50 | 22.26374327 | −0.94583 | −43.1573 |
| 55 | 22.87574795 | −0.73112 | −33.3606 |
| 60 | 23.41591008 | −0.54163 | −24.714 |
| 65 | 23.88011871 | −0.37878 | −17.2832 |
| 70 | 24.26484093 | −0.24381 | −11.1248 |
| 75 | 24.56714878 | −0.13775 | −6.28559 |
| 80 | 24.7847415 | −0.06142 | −2.80248 |
| 85 | 24.91596308 | −0.01538 | −0.70196 |
| 90 | 24.95981486 | 0 | 0 |

TABLE 2

| rot | 3.5" offset | | |
|---|---|---|---|
| 0 | 13.43595273 | −4.04276 | −151.592 |
| 5 | 14.44032349 | −3.69041 | −130.766 |
| 10 | 15.43705039 | −3.34074 | −110.098 |
| 15 | 16.41854772 | −2.99642 | −89.7466 |
| 20 | 17.3773457 | −2.66005 | −69.8656 |
| 25 | 18.30614731 | −2.33422 | −50.6066 |
| 30 | 19.19788379 | −2.02138 | −32.1162 |
| 35 | 20.0457685 | −1.72393 | −14.535 |
| 40 | 20.84334852 | −1.44412 | 2.003068 |
| 45 | 21.58455378 | −1.1841 | 17.3722 |
| 50 | 22.26374327 | −0.94583 | 31.45542 |
| 55 | 22.87574795 | −0.73112 | 44.14554 |
| 60 | 23.41591008 | −0.54163 | 55.34598 |
| 65 | 23.88011871 | −0.37878 | 64.9715 |
| 70 | 24.26484093 | −0.24381 | 72.94884 |
| 75 | 24.56714878 | −0.13775 | 79.21729 |
| 80 | 24.7847415 | −0.06142 | 83.72915 |
| 85 | 24.91596308 | −0.01538 | 86.45007 |
| 90 | 24.95981486 | 0 | 87.35935 |

Figure 9:
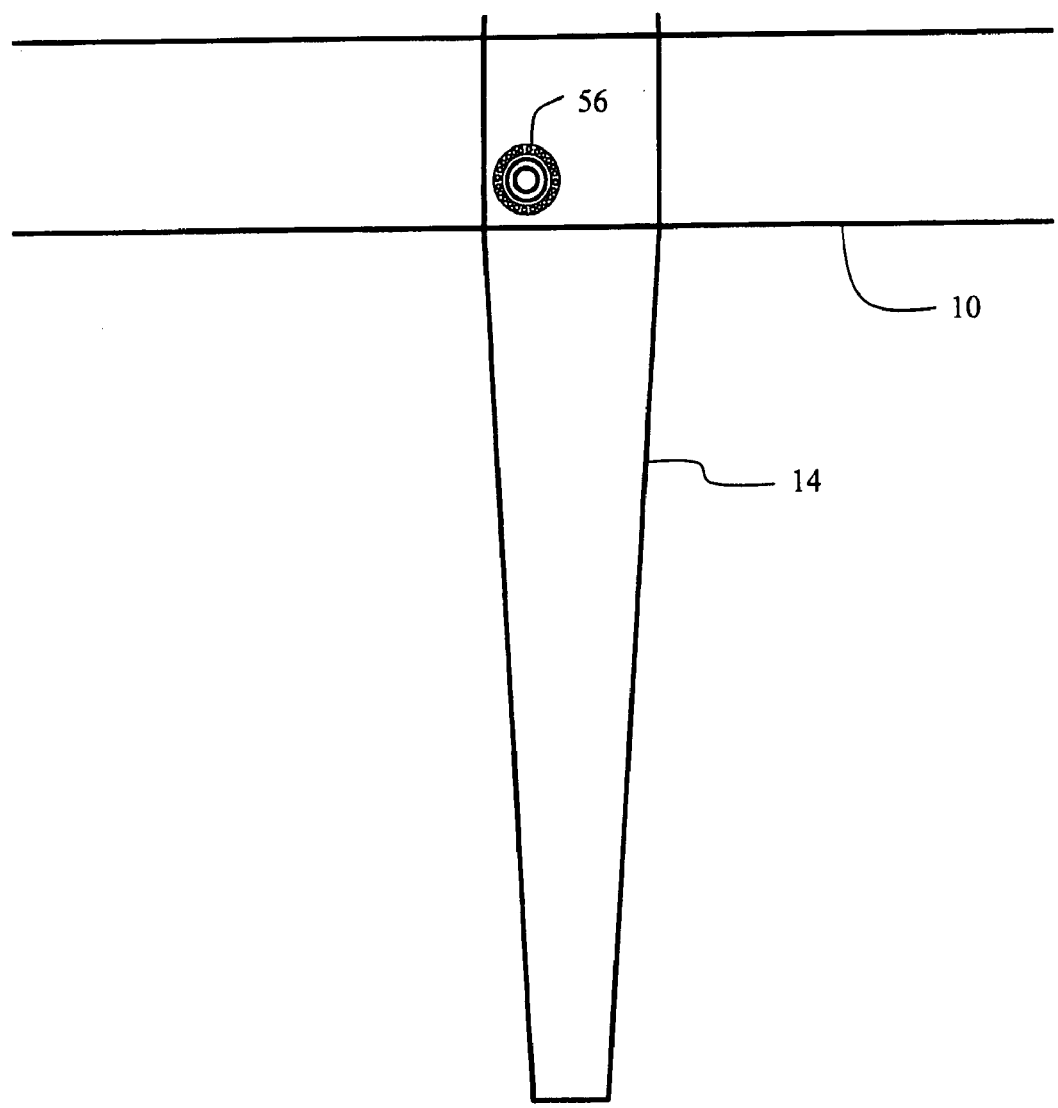
FIG. 9 is a partial view of the air vehicle of the present embodiment showing a pivot design at the offset location.
Figure 10A:
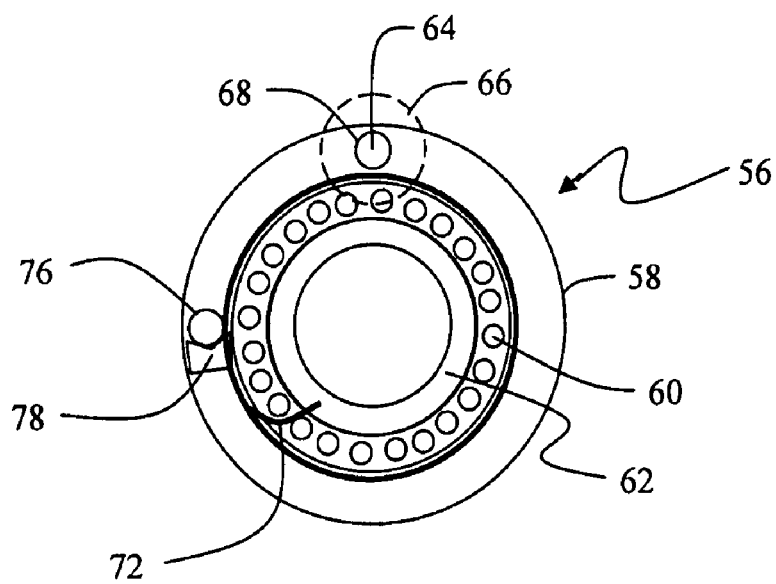
FIG. 10A is a detailed top view of a pivot, actuation and fixation system for deploying the wing in the disclosed embodiment.
Figure 10B:
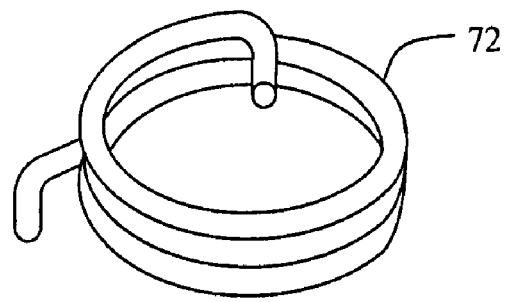
FIG. 10B is a top view of an exemplary spring providing actuation force for the system of FIG. 10A; and, FIG. 10C is a side view of the pivot, actuation and fixation system of FIG. 10A.
Figure 10C:
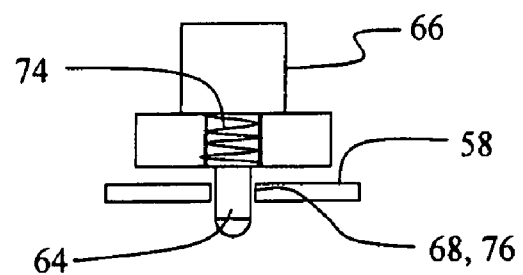

The benefit provided by the aerodynamic assistance creating the moment on the wing during deployment with the embodiment discussed above allows a pivot, actuation and fixation system that can be simplified for mechanical reliability, robustness and simplicity. FIG. 9 shows an exemplary system with a ball bearing pivot 56 located in the offset position in the present embodiment relative to the wing and fuselage. FIGS. 10A and 10C show a detailed top and side view of the bearing pivot as well as the actuation and fixation elements of the system. The ball bearing pivot incorporates a wing attachment bearing support 58 with a race housing ball bearings 60 constrained by a tube 62 attached to the fuselage. A plunger 64 is attached to the fuselage with an actuator 66.

In operation, initially the plunger rests in a first hole 68 in the wing bearing support. The actuator retracts the plunger out of the first hole that locks wing in stowed position. A rotational spring 72, shown in detail in FIG. 10B, causes the wing to rotate with respect to fuselage. The actuator releases the plunger and an axial spring 74 causes the tip of plunger to ride on the wing bearing support. The plunger is captured by a second hole 76 in the wing bearing support and the axial spring extends it to lock assembly in the deployed position. A protuberance or fence 78 prevents the plunger from skipping over the deployed-position hole. The plunger mount absorbs the shock of stopping the wing.

While a main wing of the air vehicle is employed with respect to the disclosed embodiment the system may be applied to any deployable symmetric aerodynamic body on the air vehicle benefiting from axial displacement along the fuselage from the stowed to deployed position or deployment assistance by offset aerodynamic moment.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A folding wing structure comprising:
   a wing having a span equal to a fuselage length and movable from a first stowed position longitudinally aligned with the fuselage to a second deployed position perpendicular to the fuselage;
   a pivot offset laterally and aft from a symmetry point on a centerline of the fuselage and offset forward toward the leading edge from a chord centerpoint on the wing for rotation of the wing from the first position to the second position, said rotation resulting in an aft position of the center chord point relative to the fuselage symmetry point.

2. A folding wing structure as defined in claim 1 wherein the aft offset and the lateral and corresponding forward offset are equal.

3. A folding wing structure as defined in claim 1 wherein the pivot is offset from the leading edge about 25% of mean aerodynamic chord.

4. A folding wing structure as defined in claim 1 wherein the fuselage length is about 140 inches and a wing chord is about 8 inches, said lateral offset comprising about 3.5 inches and said forward offset comprising about 3.5 inches.

5. A folding wing structure as defined in claim 1 wherein a moment about the pivot induced by aerodynamic force assists in deployment for a portion of the rotation.

6. A folding wing structure as defined in claim 1 wherein the pivot comprises:
   a ball bearing pivot incorporating a wing attachment bearing support with a race;
   ball bearings housed within the race;
   a tube attached to the fuselage concentric to the bearing support and constraining the ball bearings;
   a plunger attached to the fuselage with an actuator;
   a first hole in the wing bearing support receiving the plunger with the wing in the stowed position;
   a rotational spring urging the wing to rotate with respect to fuselage upon withdrawal of the plunger from the first hole by the actuator;
   a second hole in the wing bearing support positioned to capture the plunger with the wing in the deployed position.

7. A folding wing structure as defined in claim 6 further comprising an axial spring urging the plunger into engagement with the first and second holes.

8. A folding wing structure as defined in claim 6 further comprising a protuberance to prevents the plunger from skipping over the second hole.

9. An aircraft with a folding wing comprising
   a fuselage
   a single piece wing mounted atop said fuselage
   said wing mounted to said fuselage on a pivot so that the wing can be stowed parallel to the fuselage
   said wing pivot positioned so that when stowed the wing does not protrude beyond the ends of the fuselage
   said wing pivot further positioned offset from a centerline of the fuselage and a chord centerpoint of the wing so that a spanwise axis of the wing moves to a deployed position above the fuselage that provides for an optimum center of gravity for flight when deployed.

10. An aircraft as defined in claim 9 wherein the offset from the fuselage centerline and chord centerpoint are equal.

11. An aircraft as defined in claim 9 wherein the pivot is offset from the wing leading edge about 25% of mean aerodynamic chord.

12. An aircraft as defined in claim 10 wherein the fuselage length is about 144 inches and a wing chord is about 14 inches, said offset comprising about 3.5 inches.

13. An aircraft as defined in claim 10 wherein the offset from a centerline of the fuselage is port for clockwise rotation of the wing, as viewed from above, from the stowed to deployed position and the offset from the chord centerpoint is toward a leading edge of the wing.

14. An aircraft with a folding aerodynamic structure comprising:
a fuselage
a single piece aerodynamic structure mounted atop said fuselage
said aerodynamic structure mounted to said fuselage on a pivot so that the aerodynamic structure can be stowed parallel to the fuselage
said aerodynamic structure pivot positioned so that when stowed the aerodynamic structure does not protrude beyond the ends of the fuselage
said aerodynamic structure pivot further positioned offset from a centerline of the fuselage and a chord centerpoint of the aerodynamic structure so that a spanwise axis of the aerodynamic structure moves to a deployed position above the fuselage that provides for optimum positioning when deployed.

15. An aircraft as defined in claim 14 wherein the offset from the fuselage centerline and chord centerpoint are equal.

16. A method for stowed aerodynamic structure deployment in an air vehicle comprising the steps of:
establishing a fuselage length;
determining a span of the aerodynamic structure accommodated by the fuselage length with the aerodynamic structure in a stowed position with a span parallel to the fuselage.
determining a desired longitudinal displacement for the aerodynamic structure from a symmetry point on a center line of the fuselage; and,
positioning a pivot offset from the fuselage centerline and offset from a symmetry point on the centerline with a corresponding offset from a centerpoint on a chord of the aerodynamic structure to induce longitudinal motion for the wing chord center with respect to the fuselage symmetry point effected by rotation from the stowed to the deployed position.

17. A method as defined in claim 16 wherein the offset from the aerodynamic structure chord center and the offset from the fuselage centerline are equal.

18. A method as defined in claim 16 wherein the longitudinal displacement is aft with respect to the symmetry point.

19. A method as defined in claim 16 wherein offset from a centerline of the fuselage is port for clockwise rotation of the aerodynamic structure, as viewed from above, from the stowed to deployed position and the offset from the chord centerpoint is toward a leading edge of the aerodynamic structure.

20. A method as defined in claim 16 further comprising the step of inducing a moment about the pivot point for assistance in urging rotation of the aerodynamic structure during at least a portion of the rotation.

* * * * *